US009429246B2

(12) United States Patent
Chen et al.

(10) Patent No.: US 9,429,246 B2
(45) Date of Patent: Aug. 30, 2016

(54) FAUCET WITH A MONITORING DEVICE AND A MONITORING METHOD THEREOF

(76) Inventors: Jui-Chien Chen, Changhua County (TW); Jui-Ching Chen, Changhua County (TW)

( * ) Notice: Subject to any disclaimer, the term of this patent is extended or adjusted under 35 U.S.C. 154(b) by 531 days.

(21) Appl. No.: 13/344,828

(22) Filed: Jan. 6, 2012

(65) Prior Publication Data

US 2013/0074938 A1 Mar. 28, 2013

(30) Foreign Application Priority Data

Sep. 26, 2011 (TW) .............................. 100134573 A

(51) Int. Cl.
*E03C 1/04* (2006.01)
*F16K 37/00* (2006.01)
*E03C 1/05* (2006.01)

(52) U.S. Cl.
CPC ............. *F16K 37/0041* (2013.01); *E03C 1/04* (2013.01); *E03C 1/0412* (2013.01); *E03C 1/057* (2013.01); *F16K 37/0033* (2013.01); *E03C 2201/40* (2013.01); *Y10T 137/0318* (2015.04); *Y10T 137/8158* (2015.04); *Y10T 137/8208* (2015.04); *Y10T 137/8242* (2015.04)

(58) Field of Classification Search
CPC .. F16K 37/0033; F16K 37/0041; E03C 1/04; Y10T 137/8242; Y10T 137/8208
USPC ................... 137/551, 552.7, 554; 210/85, 91
See application file for complete search history.

(56) References Cited

U.S. PATENT DOCUMENTS

| 5,935,426 A * | 8/1999 | Giordano et al. ............... 210/87 |
| 6,673,250 B2 * | 1/2004 | Kuennen et al. ........ 210/748.11 |
| 2007/0283583 A1* | 12/2007 | Subbiondo et al. ............ 33/268 |
| 2010/0006166 A1* | 1/2010 | Chen et al. ................... 137/801 |

FOREIGN PATENT DOCUMENTS

| CN | 1748146 | 3/2006 |
| CN | 1773216 | 5/2006 |
| CN | 201705946 | 1/2011 |
| DE | 10219171 | 11/2003 |

(Continued)

OTHER PUBLICATIONS

Horowitz, P. and Hill, W., The Art of Electronics, pp. 917-918, 938-940 and 974-979, 1996, 2nd Edition, Cambridge University Press.

(Continued)

*Primary Examiner* — Atif Chaudry
(74) *Attorney, Agent, or Firm* — Faegre Baker Daniels LLP

(57) ABSTRACT

A faucet includes a faucet body, a switch unit and a monitoring device. The switch unit is coupled rotatably to the faucet body. The monitoring device is mounted to the switch unit and includes an angle detector, a microprocessor and an alert unit. The angle detector is for detecting angular rotation of the switch unit, and is for generating angle information. The microprocessor is for receiving the angle information, for recording a cumulative time period within which the switch unit is in an open state, and for calculating an outflow value accordingly. The microprocessor generates an alert signal for the alert unit upon determining that the outflow value has reached a predetermined threshold.

10 Claims, 4 Drawing Sheets

(56) References Cited

FOREIGN PATENT DOCUMENTS

| EP | 1634633 A2 | 3/2006 |
|---|---|---|
| TW | 381015 | 5/2010 |
| TW | M381015 | 5/2010 |
| WO | 2009/090197 | 7/2009 |
| WO | 2009090197 A1 | 7/2009 |
| WO | WO2009/090197 A1 | 7/2009 |
| WO | 2010/062954 | 6/2010 |

OTHER PUBLICATIONS

The Examination Decision for Reexamination issued to Chinese Utility model Patent Application No. 201120425564.1 by the State Intellectual Property Office of the People's Republic of China dated Jul. 31, 2014.

The Chinese Edition of Halit Eren, "Wireless Sensors and Instruments: Networks, Design, and Applications", 2005, which is presented to the SIPO as an evidence.

* cited by examiner

FAUCET WITH A MONITORING DEVICE AND A MONITORING METHOD THEREOF

CROSS-REFERENCE TO RELATED APPLICATION

This application claims priority of Taiwanese Application No. 100134573, filed on Sep. 26, 2011.

BACKGROUND OF THE INVENTION

1. Field of the Invention

The invention relates to a faucet, more particularly to a faucet with a monitoring device, and a monitoring method thereof.

2. Description of the Related Art

A conventional water filter attached to a faucet is configured to filter a certain amount of water properly before it is required to replace a filtering component therein. Conventionally, it is recommended that a user replace the filtering component periodically. However, since water usage varies among different users, undesired instances such as the filtering component being worn out before replacement or the filtering component still being at the time of replacement usable may occur.

Therefore, in Taiwanese utility model no. M345165, there is disclosed a faucet including a valve body, a grip, a magnetic element disposed on the grip, a magnetic sensor disposed in the valve body, a controlling unit electrically coupled to the magnetic element, and a display electrically coupled to the controlling unit.

The magnetic sensor is configured to determine whether the faucet is in an open state by sensing proximity of the magnetic element, and the controlling unit is configured to record a cumulative time period within which the faucet is in the open state. Upon determining that the faucet is in the open state for over a predetermined period, the controlling unit is configured to transmit an alert signal to the display which generates an alert output, thereby providing indication to the user that the filtering component needs replacement.

Nonetheless, the aforementioned faucet has the following drawbacks.

The faucet has a relatively complicated structure due to use of the magnetic element and the magnetic sensor, such that manufacturing cost is high. In addition, the magnetic element and the magnetic sensor of the faucet have to be disposed respectively on the grip and the valve body, and have to be configured to precisely register with each other in order to operate properly, such that manufacture of the faucet is more difficult to assemble.

SUMMARY OF THE INVENTION

Therefore, the object of the present invention is to provide a faucet that includes a monitoring device, that has a relatively simple structure, and that is relatively easy to assemble.

Accordingly, a faucet of the present invention comprises a faucet body, a switch unit and a monitoring device.

The switch unit is coupled rotatably to the faucet body. The monitoring device is mounted to the switch unit and includes an angle detector, a microprocessor and an alert unit.

The angle detector is for detecting angular rotation of the switch unit from an initial position relative to the faucet body, and is for generating angle information corresponding to the angular rotation thus detected. The microprocessor is coupled electrically to the angle detector for receiving the angle information. The microprocessor is for recording a cumulative time period within which the switch unit is in an open state, for calculating an outflow rate according to the angle information, and for calculating an outflow value according to the outflow rate and the cumulative time period. The microprocessor generates an alert signal upon determining that the outflow value has reached a predetermined threshold. The alert unit is coupled electrically to the microprocessor for receiving the alert signal, and for generating an alert output in response to the alert signal.

Another object of the present invention is to provide a monitoring device that has a relatively simple structure and that is relatively easy to assemble.

Accordingly, a monitoring device of the present invention is for a faucet. The faucet includes a faucet body and a switch unit coupled rotatably to the faucet body. The monitoring device is to be mounted to the switch unit and comprises an angle detector, a microprocessor and an alert unit.

The angle detector is for detecting angular rotation of the switch unit from an initial position relative to the faucet body, and for generating angle information corresponding to the angular rotation thus detected.

The microprocessor is coupled electrically to the angle detector. The microprocessor is configured for receiving the angle information, for recording a cumulative time period within which the switch unit is in an open state, for calculating an outflow rate according to the angle information, and for calculating an outflow value according to the outflow rate and the cumulative time period. The microprocessor generates an alert signal upon determining that the outflow value has reached a predetermined threshold.

The alert unit is coupled electrically to the microprocessor for receiving the alert signal and for generating an alert output in response to the alert signal.

Still another object of the present invention is to provide a monitoring method for implementation by a faucet. The faucet includes a faucet body, a switch unit coupled rotatably to the faucet body, and a monitoring device mounted to the switch unit.

Accordingly, a monitoring method of the present invention comprises the steps of:

a) configuring the monitoring device for detecting angular rotation of the switch unit from an initial position relative to the faucet body, and for generating angle information corresponding to the angular rotation thus detected;

b) configuring the monitoring device for recording a cumulative time period within which the switch unit is in an open state, and for calculating an outflow rate according to the angle information;

c) configuring the monitoring device for calculating an outflow value according to the outflow rate and the cumulative time period;

d) configuring the monitoring device for determining whether the outflow value has reached a predetermined threshold; and e) configuring the monitoring device for generating an alert output upon determining that the outflow value has reached a predetermined threshold.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
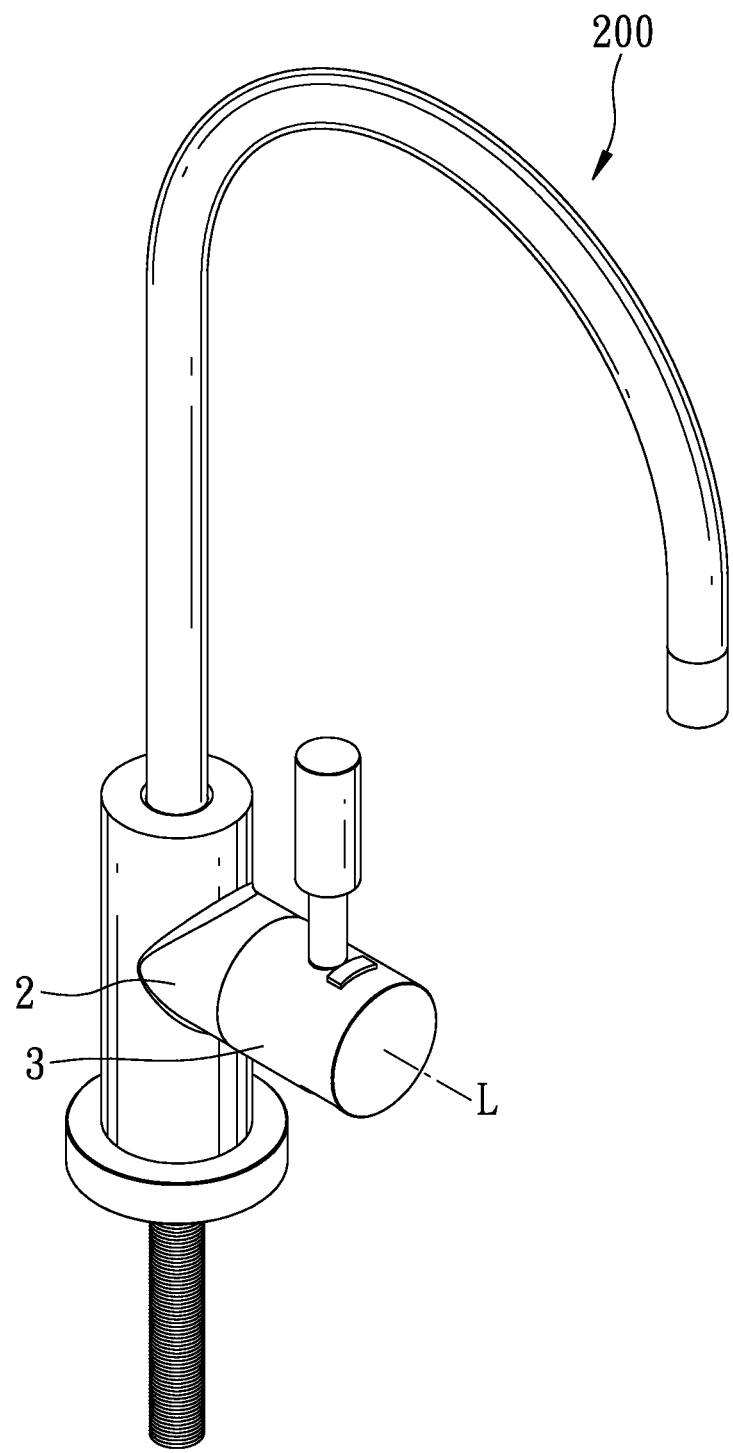
FIG. 1 is a perspective view of a preferred embodiment of a faucet according to the invention.
Figure 2:
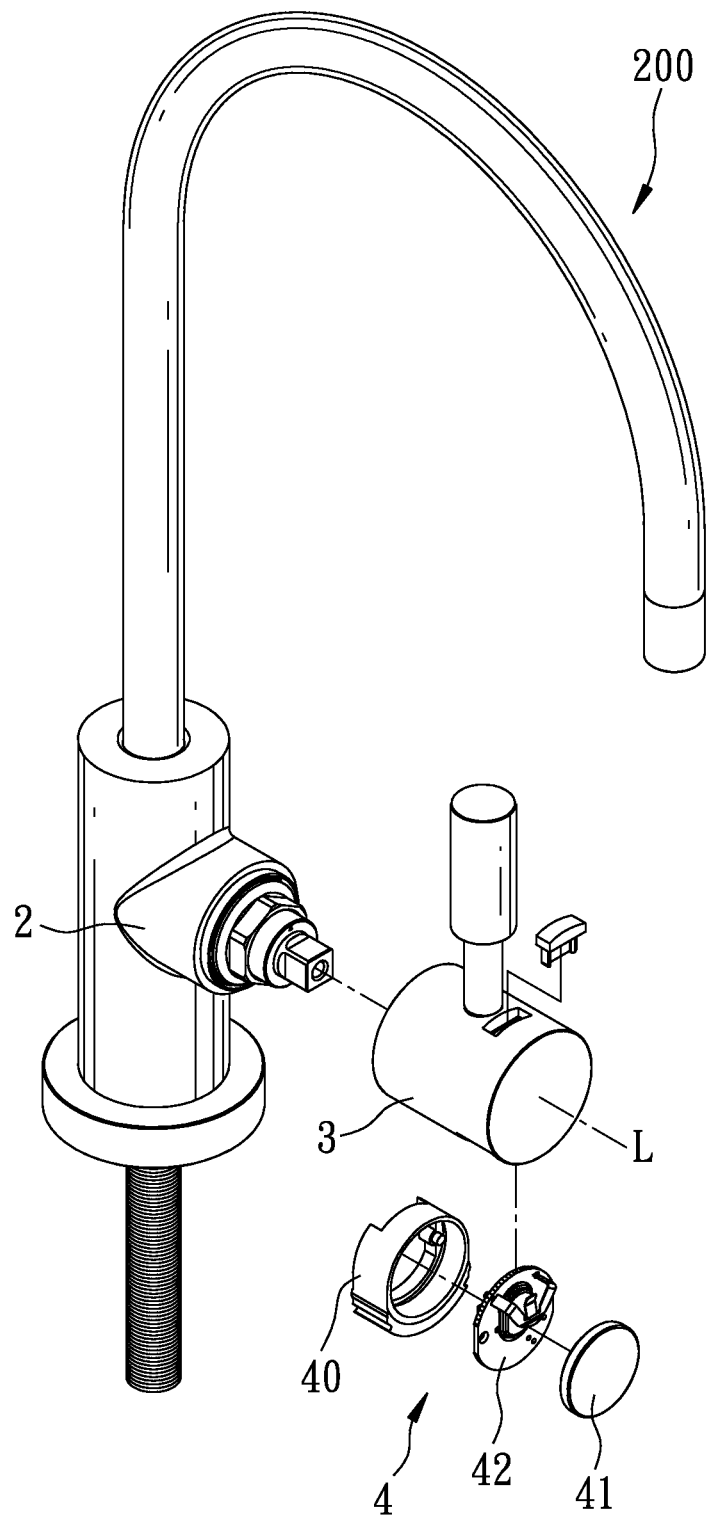
FIG. 2 is an exploded perspective view of a faucet body, a switch unit and a monitoring device of the preferred embodiment.
Figure 3:
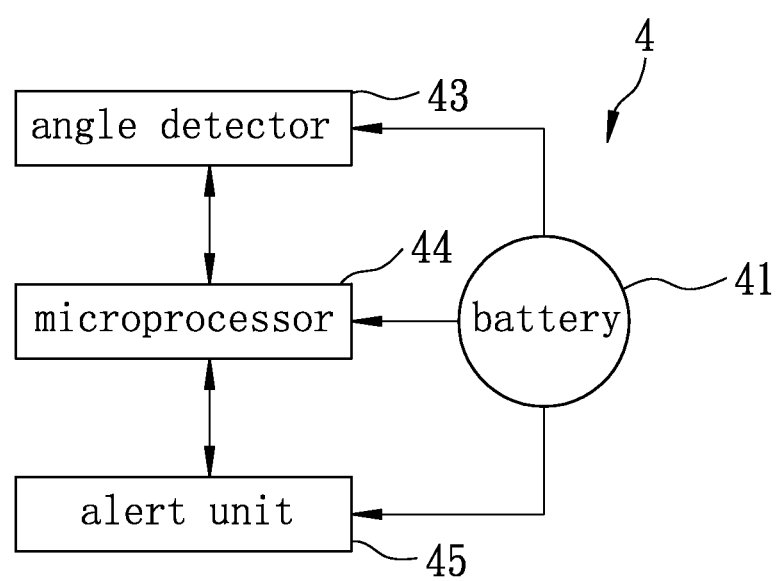
FIG. 3 is a block diagram illustrating electrical connections among an angle detector, a microprocessor and a display of the monitoring device.

As shown in FIGS. 1 to 3, the preferred embodiment of a faucet 200 according to the present invention comprises a faucet body 2, a switch unit 3 and a monitoring device 4.

The faucet body 2 is to be coupled to a backend water filter for supplying water filtered by the water filter.

The switch unit 3 is coupled rotatably to the faucet body 2, and has an axis of rotation (L) that is relative to the faucet body 2, and that extends about a horizontal plane. The switch unit 3 is configured to rotate along the axis of rotation (L) relative to the faucet body 2. A larger angular rotation of the switch unit 3 suggests that water is released from the faucet 200 at a faster rate.

The monitoring device 4 is mounted to the switch unit 3, and includes a shell 40, a battery 41, a circuit board 42, an angle detector 43, a microprocessor 44 and an alert unit 45. In this embodiment, the angle detector 43 may be a three-axis gravitational sensor or a gyroscope, and the alert unit 45 is a display using a light emitting diode (LED) or a liquid crystal display (LCD).

The shell 40 is mounted detachably to the switch unit 3. The circuit board 42 is disposed in the shell 40. The battery 41, the angle detector 43 and the alert unit 45 are disposed on the circuit board 42. As shown in FIG. 3, the microprocessor 44 is coupled electrically to the angle detector 43 and the alert unit 45, and the battery 41 is coupled electrically to the angle detector the microprocessor 44 and the alert unit 45 for providing electricity thereto.

When the switch unit 3 is rotated by a user (i.e., the faucet is switched open by the user and is in an open state), the angle detector 43 detects angular rotation of the switch unit 3 from an initial position relative to the faucet body 2, and generates angle information corresponding to the angular rotation thus detected. The microprocessor 44 is configured to receive the angle information, and to record a cumulative time period within which the switch unit 2 is in the open state. The microprocessor 44 subsequently calculates an outflow rate according to the angle information, and calculates an outflow value according to the outflow rate and the cumulative time period. Upon determining that the outflow value has reached a predetermined threshold, the microprocessor 44 generates an alert signal. The alert unit 45 is configured to receive the alert signal and to generate an alert output in response to the alert signal. The alert output provides indication to the user that the water filter requires replacement.

Figure 4:
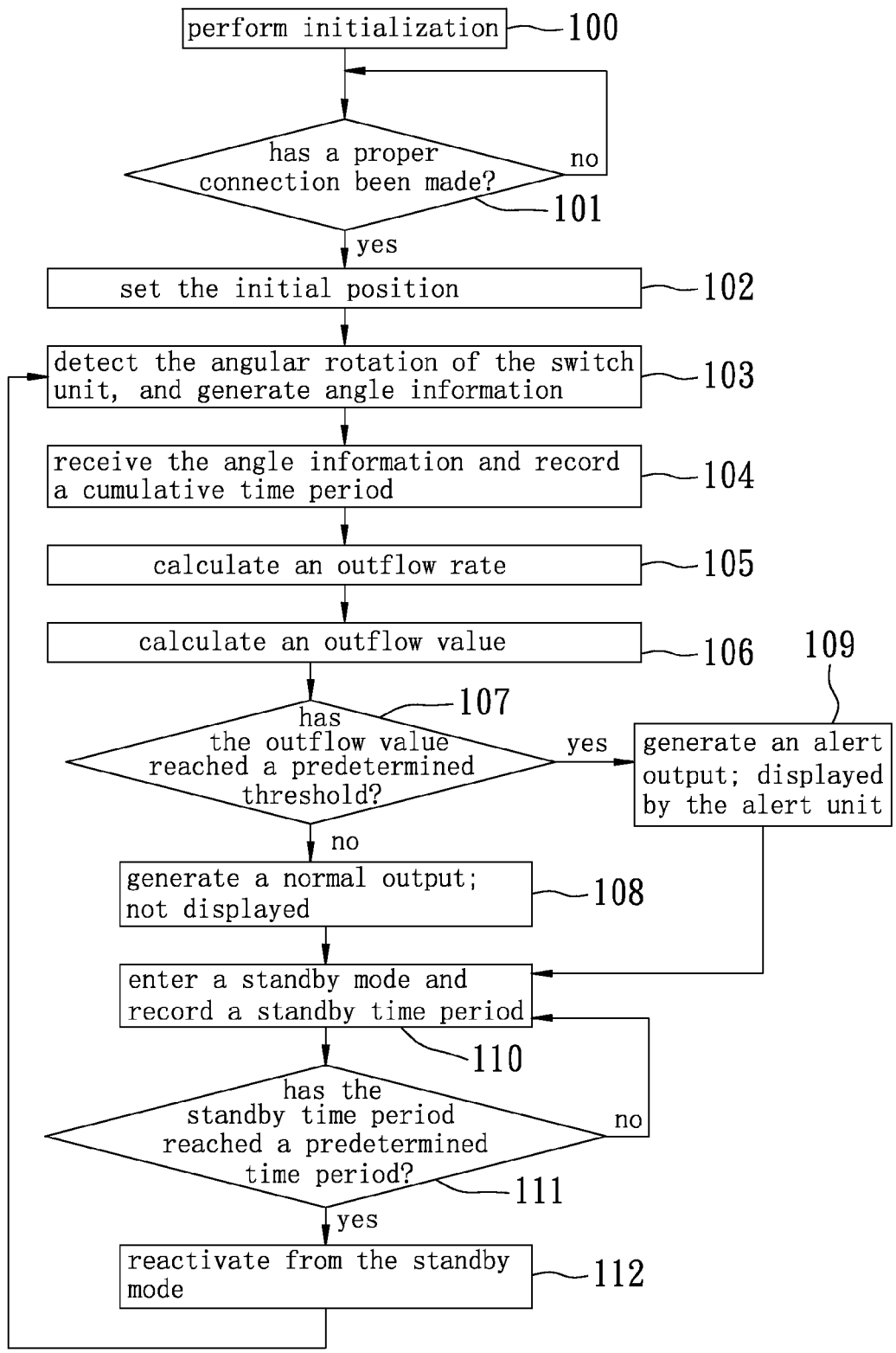
FIG. 4 is a flow chart of a monitoring method of the preferred embodiment.

Further reference is now made to FIG. 4, showing a monitoring method for implementation by the monitoring device 4 of the faucet 200.

In step 100, the microprocessor 44 of the monitoring device 4 is configured for performing initialization, and for verifying connections among the microprocessor 44, the angle detector 43 and the alert unit 45. In this embodiment, step 100 is implemented when the battery 41 is electrically coupled and provides electricity to the monitoring device 4.

In step 101, the microprocessor 44 of the monitoring device 4 is configured for determining whether a proper connection between the monitoring device 4 and the switch unit 3 has been made. In this embodiment, it is determined that a proper connection between the monitoring device 4 and the switch unit 3 has been made a preset time period after finding that the microprocessor 44 has entered a mechanical equilibrium state. More specifically, the microprocessor 44 begins recording a cumulative time period within which the microprocessor 44 is in a mechanical equilibrium state upon receipt of a signal resulting from the user pressing a designated button (not shown). The flow goes to step 102 when it is determined that a proper connection between the monitoring device 4 and the switch unit 3 has been made, and goes back to repeat step 101 when otherwise.

In step 102, the monitoring device 4 is configured for setting the initial position relative to the faucet body 2.

In step 103, the angle detector 43 of the monitoring device 4 is configured for detecting angular rotation of the switch unit 3 from the initial position, and for generating the angle information corresponding to the angular rotation thus detected. More specifically, the angle detector 43 is configured to filter out ambient noise signal such as vibration prior to the detection, and to detect an angular acceleration of the switch unit 3. The angular acceleration is processed by integration twice, in order to evaluate the overall angular displacement from the initial position. The angle information is obtained by adding up the angular displacement to the initial position.

In step 104, the microprocessor 44 of the monitoring device 4 is configured for recording a cumulative time period within which the switch unit 3 is in the open state, and for receiving the angle information obtained in step 103.

In step 105, the microprocessor 44 of the monitoring device 4 is configured for calculating an outflow rate according to the angle information. More specifically, the microprocessor 44 looks up a table stored therein, which contains outflow rate information that corresponds to the angle information.

In step 106, the microprocessor 44 of the monitoring device 4 is configured for calculating an outflow value according to the outflow rate and the cumulative time period.

In step 107, the microprocessor 44 of the monitoring device 4 is configured for determining whether the outflow value has reached a predetermined threshold. The flow goes to step 109 when the outflow value has reached the predetermined threshold, and goes to step 108 when otherwise.

In step 108, the microprocessor 44 of the monitoring device 4 is configured to generate a normal output, which is not displayed by the alert unit 45. In step 109, the microprocessor 44 of the monitoring device 4 is configured to generate an alert output, which is displayed by the alert unit 45m thereby notifying the user that the water filter needs replacement.

The flow then goes to step 110, in which the monitoring device 4 is configured to enter a standby mode, and to record a standby time period within which the monitoring device 4 has entered the standby mode.

In step 111, the microprocessor 44 of the monitoring device 4 is configured for determining whether the standby time period has reached a predetermined time period. The flow goes to step 112 when the standby time period has reached the predetermined time period, and goes back to step 110 when otherwise.

In step 112, the monitoring device 4 is configured for reactivating from the standby mode. Once the monitoring device 4 is reactivated, the flow goes back to step 103.

To sum up, the preferred embodiment of this invention has the following advantages.

The monitoring device 4 has a relatively simple structure, using only a single element (i.e., the angle detector 43) to detect angular rotation of the switch unit 3. This can efficiently reduce manufacturing costs.

The monitoring device 4 can be assembled to the switch unit 3 conveniently, and is operable once the initial position is set. Since the angle detector 43 only detects the angular rotation of the switch unit 3 from the initial position, no precise positioning of the monitoring device 4 relative to the faucet body 2 is required. Moreover, the monitoring device 4 may be sold individually, and fitted to other faucets.

Additionally, the monitoring device 4 is capable of calculating a relatively precise water outflow value by implementing the aforementioned method, thereby being capable of accurately providing indication to the user that the water filter needs replacement.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A faucet comprising:
    a faucet body;
    a switch unit coupled rotatably to said faucet body; and
    a monitoring device mounted to said switch unit, said monitoring device including:
    an angle detector for detecting angular rotation of said switch unit from an initial position relative to said faucet body, and for generating angle information corresponding to the angular rotation thus detected;
    a microprocessor coupled electrically to said angle detector for receiving the angle information, for recording a cumulative time period within which said switch unit is in an open state, for calculating an outflow rate according to the angle information, and for calculating an outflow value according to the outflow rate and the cumulative time period, said microprocessor determining when the microprocessor is in a mechanical equilibrium state and said microprocessor generating an alert signal upon determining that the outflow value has reached a predetermined threshold; and
    an alert unit coupled electrically to said microprocessor for receiving the alert signal and for generating an alert output in response to the alert signal; wherein said angle detector is a three-axis gravitational sensor, and the initial position is set after said microprocessor has entered a mechanical equilibrium state.

2. The faucet as claimed in claim 1, wherein said alert unit includes a light emitting diode.

3. The faucet as claimed in claim 1, wherein said monitoring device further includes a shell mounted detachably to said switch unit, and a circuit board disposed in said shell, said angle detector and said alert unit being disposed on said circuit board.

4. The faucet as claimed in claim 1, wherein said switch unit has an axis of rotation relative to said faucet body that extends along a substantially horizontal plane.

5. A monitoring device for a faucet, the faucet including a faucet body and a switch unit coupled rotatably to the faucet body, said monitoring device to be mounted to the switch unit and comprising:
    an angle detector for detecting angular rotation of the switch unit from an initial position relative to the faucet body, and for generating angle information corresponding to the angular rotation thus detected;
    a microprocessor coupled electrically to said angle detector for receiving the angle information, for recording a cumulative time period within which the switch unit is in an open state, for calculating an outflow rate according to the angle information, and for calculating an outflow value according to the outflow rate and the cumulative time period, said microprocessor determining when the microprocessor is in a mechanical equilibrium state and said microprocessor generating an alert signal upon determining that the outflow value has reached a predetermined threshold; and
    an alert unit coupled electrically to said microprocessor for receiving the alert signal and for generating an alert output in response to the alert signal; wherein said angle detector is a three-axis gravitational sensor, and the initial position is set after said microprocessor has entered a mechanical equilibrium state.

6. The monitoring device as claimed in claim 5, wherein said alert unit includes a light emitting diode.

7. The monitoring device as claimed in claim 5, further comprising a shell to be mounted detachably to the switch unit, and a circuit board disposed in said shell, said angle detector and said alert unit being disposed on said circuit board.

8. A monitoring method for implementation by a faucet that includes a faucet body, a switch unit coupled rotatably to the faucet body, and a monitoring device mounted to the switch unit and including a three-axis gravitational sensor, the monitoring method comprising the steps of:
    i) configuring the monitoring device for performing initialization, followed by determining whether a proper connection between the monitoring device and the switch unit has been made;
    ii) determining that the monitoring device is in a mechanical equilibrium state; and
    iii) configuring the monitoring device for setting an initial position upon determining that the proper connection between the monitoring device and the switch unit has been made and that the monitoring device has entered a mechanical equilibrium state;
    a) configuring the monitoring device for detecting angular rotation of the switch unit from an initial position relative to the faucet body, and for generating angle information corresponding to the angular rotation thus detected;
    b) configuring the monitoring, device for recording a cumulative time period within which the switch unit is in an open state, and for calculating an outflow rate according to the angle information;
    c) configuring the monitoring device for calculating an outflow value according to the outflow rate and the cumulative time period;
    d) configuring the monitoring device for determining whether the outflow value has reached a predetermined threshold; and
    e) configuring the monitoring device for generating an alert output upon determining that the outflow value has reached a predetermined threshold.

9. The monitoring method as claimed in claim 8, wherein, in step e), the monitoring device is configured to generate a normal output upon determining that the outflow value has not yet reached the predetermined threshold.

10. The monitoring method as claimed in claim 8, further comprising, after step e), the steps of:
- iii) configuring the monitoring device for entering a standby mode; and
- iv) configuring the monitoring device for reactivating from the standby mode a predetermined time period after the monitoring device has entered the standby mode.

\* \* \* \* \*